United States Patent
Lu et al.

(10) Patent No.: US 11,691,354 B2
(45) Date of Patent: Jul. 4, 2023

(54) MANUFACTURING METHOD OF HALOGEN-FREE FLAME-RETARDANT THERMOPLASTIC BRAIDED FIBER REINFORCED POLYMER COMPOSITE BOARD AND PRODUCT THEREOF

(71) Applicant: COMPLAM MATERIAL CO., LTD., Taichung (TW)

(72) Inventors: Chia yang Lu, Taichung (TW); Sheng Yen Wu, Taichung (TW); Yi Wen Xiao, Taichung (TW)

(73) Assignee: COMPLAM MATERIAL CO., LTD., Taichung (TW)

( * ) Notice: Subject to any disclaimer, the term of this patent is extended or adjusted under 35 U.S.C. 154(b) by 0 days.

(21) Appl. No.: 17/458,822

(22) Filed: Aug. 27, 2021

(65) Prior Publication Data
US 2022/0203631 A1 Jun. 30, 2022

(30) Foreign Application Priority Data
Dec. 24, 2020 (TW) .................................. 109145992

(51) Int. Cl.
*B29C 70/34* (2006.01)
*B29C 70/22* (2006.01)
(Continued)

(52) U.S. Cl.
CPC ........ *B29C 70/224* (2013.01); *B29C 48/0011* (2019.02); *B29C 48/07* (2019.02); *B29C 48/2886* (2019.02); *B29C 70/465* (2013.01); *B29K 2069/00* (2013.01); *B29K 2105/0827* (2013.01); *B29K 2105/206* (2013.01);
(Continued)

(58) Field of Classification Search
CPC ... B32B 38/004; B32B 37/0053; B29C 48/07; B29C 48/0019; B29C 48/0014; B29C 70/521; B29C 70/50; B29C 70/504
See application file for complete search history.

(56) References Cited

U.S. PATENT DOCUMENTS 4,414,266 A * 11/1983 Archer .................... B29C 51/14
156/244.11
5,316,604 A * 5/1994 Fell .................... B29C 66/91931
428/116
(Continued)

FOREIGN PATENT DOCUMENTS

| CN | 105017764 A | 11/2015 |
| CN | 103450668 B | 8/2016 |
| CN | 103772894 B | 10/2016 |

*Primary Examiner* — Matthew J Daniels
(74) *Attorney, Agent, or Firm* — Alan D. Kamrath; Karin L. Williams; Mayer & Williams PC

(57) ABSTRACT

A manufacturing method of a halogen-free flame-retardant thermoplastic braided fiber reinforced polymer composite board, comprising steps of: preparing a recycled material containing a halogen-free flame-retardant thermoplastic braided fiber reinforced polymer composite; adding a polymer base material to the recycled material to form a core layer material and extruding the core layer material with a low shear extruder; hot pressing the core layer material by rollers to obtain a recycled fiber core layer; preparing a reinforcement layer containing a fiber material or a fabric with pores; and stacking and hot pressing the recycled fiber core layer and the reinforcement layer.

9 Claims, 5 Drawing Sheets

(51) Int. Cl.
    *B29C 70/46*     (2006.01)
    *B29C 48/00*     (2019.01)
    *B29C 48/07*     (2019.01)
    *B29C 48/285*     (2019.01)
    B29K 301/12     (2006.01)
    B29K 105/08     (2006.01)
    B29K 105/20     (2006.01)
    B29K 105/26     (2006.01)
    B29K 69/00     (2006.01)

(52) U.S. Cl.
    CPC ...... *B29K 2105/26* (2013.01); *B29K 2301/12* (2013.01); *B29K 2995/0016* (2013.01)

(56) References Cited

U.S. PATENT DOCUMENTS

| | | | |
|---|---|---|---|
| 7,785,703 B2 * | 8/2010 | Agrawal | B32B 5/18 428/319.3 |
| 9,701,069 B2 | 7/2017 | Kosaka et al. | |
| 2002/0106503 A1 * | 8/2002 | Monk | B32B 5/18 428/317.1 |
| 2002/0192467 A1 * | 12/2002 | Secrist | B29C 70/50 156/60 |
| 2016/0185017 A1 | 6/2016 | Kao | |
| 2016/0279896 A1 | 9/2016 | Liu et al. | |
| 2017/0348895 A1 | 12/2017 | Naets et al. | |

\* cited by examiner

```
┌─────────────────────────────────────────┐
│ recycling a used material containing a  │
│ halogen-free flame-retardant thermoplastic │──A
│ braided fiber reinforced polymer composite │
│ having a flammability rating of UL94 V-0 │
└─────────────────────────────────────────┘
                    │
┌─────────────────────────────────────────┐
│ adding a polymer base material to the used │
│ material to form a core layer material and │
│ extruding the core layer material with a low │
│ shear extruder                          │──B
└─────────────────────────────────────────┘
                    │
┌─────────────────────────────────────────┐
│ hot pressing the core layer material by │
│ rollers to obtain a recycled fiber core layer │──C
└─────────────────────────────────────────┘
                    │
┌─────────────────────────────────────────┐
│ preparing a reinforcement layer containing │
│ a fiber material or a fabric with pores │──D
└─────────────────────────────────────────┘
                    │
┌─────────────────────────────────────────┐
│ stacking and hot pressing the recycled fiber │
│ core layer and the reinforcement layer to │──E
│ cause the halogen-free flame-retardant  │
│ thermoplastic braided fiber reinforced  │
│ polymer composite of the recycled fiber core │
│ layer penetrating into the pores of the │
│ reinforcement layer to form a composite board │
│ in which dissimilar materials of recycled │
│ fiber core layer and the reinforcement layer │
│ are linked with each other              │
└─────────────────────────────────────────┘
```

FIG. 1

MANUFACTURING METHOD OF HALOGEN-FREE FLAME-RETARDANT THERMOPLASTIC BRAIDED FIBER REINFORCED POLYMER COMPOSITE BOARD AND PRODUCT THEREOF

BACKGROUND OF THE INVENTION

The present invention relates generally to a manufacturing method of a halogen-free flame-retardant thermoplastic braided fiber reinforced polymer composite board and a halogen-free flame-retardant thermoplastic braided fiber reinforced polymer composite board manufactured by the method.

The fiber-reinforced polymer composite materials have good mechanical properties, such as high strength, low density, etc., and are commonly used in the aerospace, automotive, marine, and construction industries. Further, making fiber composites flame retardant, thereby improving safety and reducing fire losses, is an important development direction of fiber composites.

In addition, as fiber composites are used in a large number and diversified manner in various fields, the recycling of waste materials and end-of-life fiber composite products generated in the production process cannot be ignored. In the face of environmental and legislative pressures and increasing landfill costs, traditional landfill and incineration treatment methods are bound to be eliminated. How to effectively recover and recycle fiber composite waste has become an important issue.

BRIEF SUMMARY OF THE INVENTION

It is therefore a primary object of the present invention to provide a manufacturing method of a halogen-free flame-retardant thermoplastic braided fiber reinforced polymer composite board and a product thereof. The halogen-free flame-retardant thermoplastic braided fiber reinforced polymer composite board manufactured by means of the manufacturing method can effectively recover and recycle the fiber composite material waste. Further, the fiber length of the recycled fiber core layer is 5 to 20 mm to achieve an excellent mechanical strength and to pass UL94-V0 flammability standard (1/32 inch thickness).

To achieve the above and other objects, the manufacturing method of the halogen-free flame-retardant thermoplastic braided fiber reinforced polymer composite board includes steps of: preparing a recycled material containing a halogen-free flame-retardant thermoplastic braided fiber reinforced polymer composite; adding a polymer base material to the recycled material to form a core layer material and extruding the core layer material with a low shear extruder; hot pressing the core layer material by rollers to obtain a recycled fiber core layer; preparing a reinforcement layer containing a fiber material or a fabric with pores; and stacking and hot pressing the recycled fiber core layer and the reinforcement layer to cause the halogen-free flame-retardant thermoplastic braided fiber reinforced polymer composite of the recycled fiber core layer penetrating into the pores of the reinforcement layer to form a composite board in which dissimilar materials of recycled fiber core layer and the reinforcement layer are cross-linked with each other. The halogen-free flame-retardant thermoplastic braided fiber reinforced polymer composite board manufactured by means of the manufacturing method includes a recycled fiber core layer and at least one reinforcement layer. The recycled fiber core layer is formed by a recycled material containing a halogen-free flame-retardant thermoplastic braided fiber reinforced polymer composite. The reinforcement layer is formed by a fiber material or a fabric with pores and has a first side and a second side. The recycled fiber core layer and the reinforcement layer are stacked and hot pressed to cause the halogen-free flame-retardant thermoplastic braided fiber reinforced polymer composite of the recycled fiber core layer penetrating into the pores of the reinforcement layer and at least a portion of the recycled fiber core layer wrapped on the first side of the reinforcement layer to form a composite board in which dissimilar materials of recycled fiber core layer and the reinforcement layer are cross-linked with each other.

The present invention will become clearer in light of the following detailed description of illustrative embodiments of this invention described in connection with the drawings.

DESCRIPTION OF THE DRAWINGS

FIG. 1 is a flow chart of a manufacturing method of a halogen-free flame-retardant thermoplastic braided fiber reinforced polymer composite board of the present invention.

DETAILED DESCRIPTION OF THE INVENTION

Please refer to FIG. 1, a manufacturing method of the a halogen-free flame-retardant thermoplastic braided fiber reinforced polymer composite board of the present invention includes a step (A), preparing a recycled material containing a halogen-free flame-retardant thermoplastic braided fiber reinforced polymer composite.

In this embodiment, in step (A), a size of the recycled material containing a halogen-free flame-retardant thermoplastic braided fiber reinforced polymer composite is 20 to 40 mm.

The manufacturing method of the halogen-free flame-retardant thermoplastic braided fiber reinforced polymer composite board of the present invention further includes a step (B), adding a polymer base material to the recycled material to form a core layer material and extruding the core layer material with a low shear extruder.

In this embodiment, in step (B), the polymer base material may be a thermoplastic resin, and the thermoplastic resin may be polycarbonate. Further, the thermoplastic resin may be a virgin material or a recycled material, and the recycled material does not contain inorganic fiber or inorganic powder. A screw speed of the low shear extruder is 20 to 80 rpm, and an extrusion temperature of the low shear extruder is 200 to 280° C. A screw pitch of the low shear extruder is 10 to 15 cm, and a screw groove depth of the low shear extruder is 20 mm.

Figure 2:
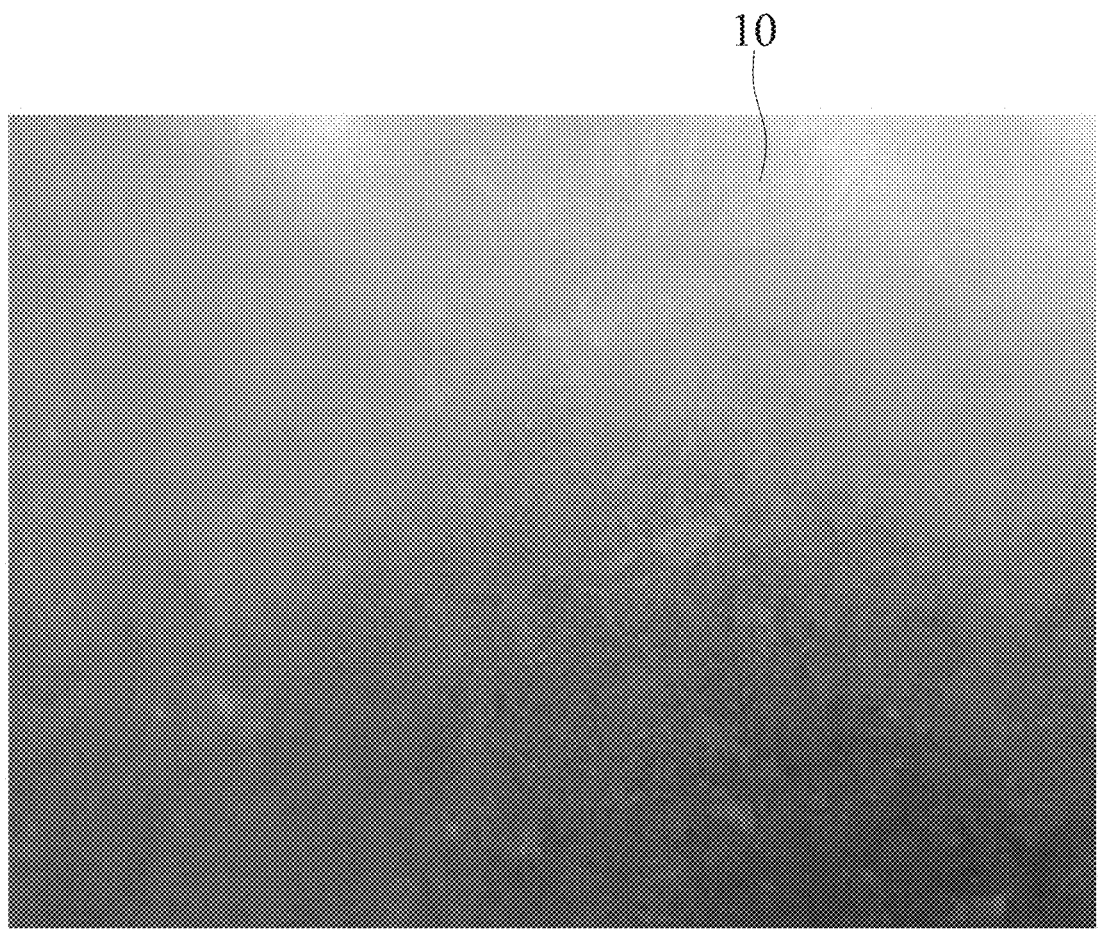
FIG. 2 is a diagram illustrating the appearance of a recycled fiber core layer of the halogen-free flame-retardant thermoplastic braided fiber reinforced polymer composite board manufactured by step (C) of the manufacturing method.

The manufacturing method of the halogen-free flame-retardant thermoplastic braided fiber reinforced polymer composite board of the present invention further includes a step (C), preparing a reinforcement layer containing a fiber material or a fabric with pores. In this embodiment, in step (C), a temperature of the rollers is 50 to 200° C., and a gap of the rollers is 0.5 to 2 mm. A fiber length of the recycled fiber core layer is 5 to 20 mm, and a thickness of the recycled fiber core layer is 0.3 to 1.2 mm. Further, the direction of extrusion is parallel to the direction of the extruder, so the mechanical strength of the recycled fiber core layer is better than that of commercially available short fiber boards, and the recycled fiber core layer can pass UL94-V0 flammability standard (1/32 inch thickness). As shown in FIG. 2, the appearance of the recycled fiber core layer 10 has a beautiful marbled appearance due to its high fiber content.

The manufacturing method of the halogen-free flame-retardant thermoplastic braided fiber reinforced polymer composite board of the present invention further includes a step (D), preparing a reinforcement layer containing a fiber material or a fabric with pores.

In this embodiment, in step (D), the reinforcement material of the reinforcement layer can include one of woven fabric, non-woven fabric, unidirectional fabric, multiaxial multilayer warp knitting (MMWK or non-crimp fabric), or a combination of them. Further, the type of reinforcement material can include one of graphite fiber, graphene fiber, carbon fiber, glass fiber, ceramic fiber, boron fiber, boron nitrogen fiber, silicon nitride fiber, mineral salt fiber, or a combination of them, are woven or non-woven fabric type, or unidirectional fiber fabric.

The manufacturing method of the halogen-free flame-retardant thermoplastic braided fiber reinforced polymer composite board of the present invention further includes a step (E), stacking and hot pressing the recycled fiber core layer and the reinforcement layer to cause the halogen-free flame-retardant thermoplastic braided fiber reinforced polymer composite of the recycled fiber core layer penetrating into the pores of the reinforcement layer to form a composite board in which dissimilar materials of recycled fiber core layer and the reinforcement layer are cross-linked with each other.

Figure 3:
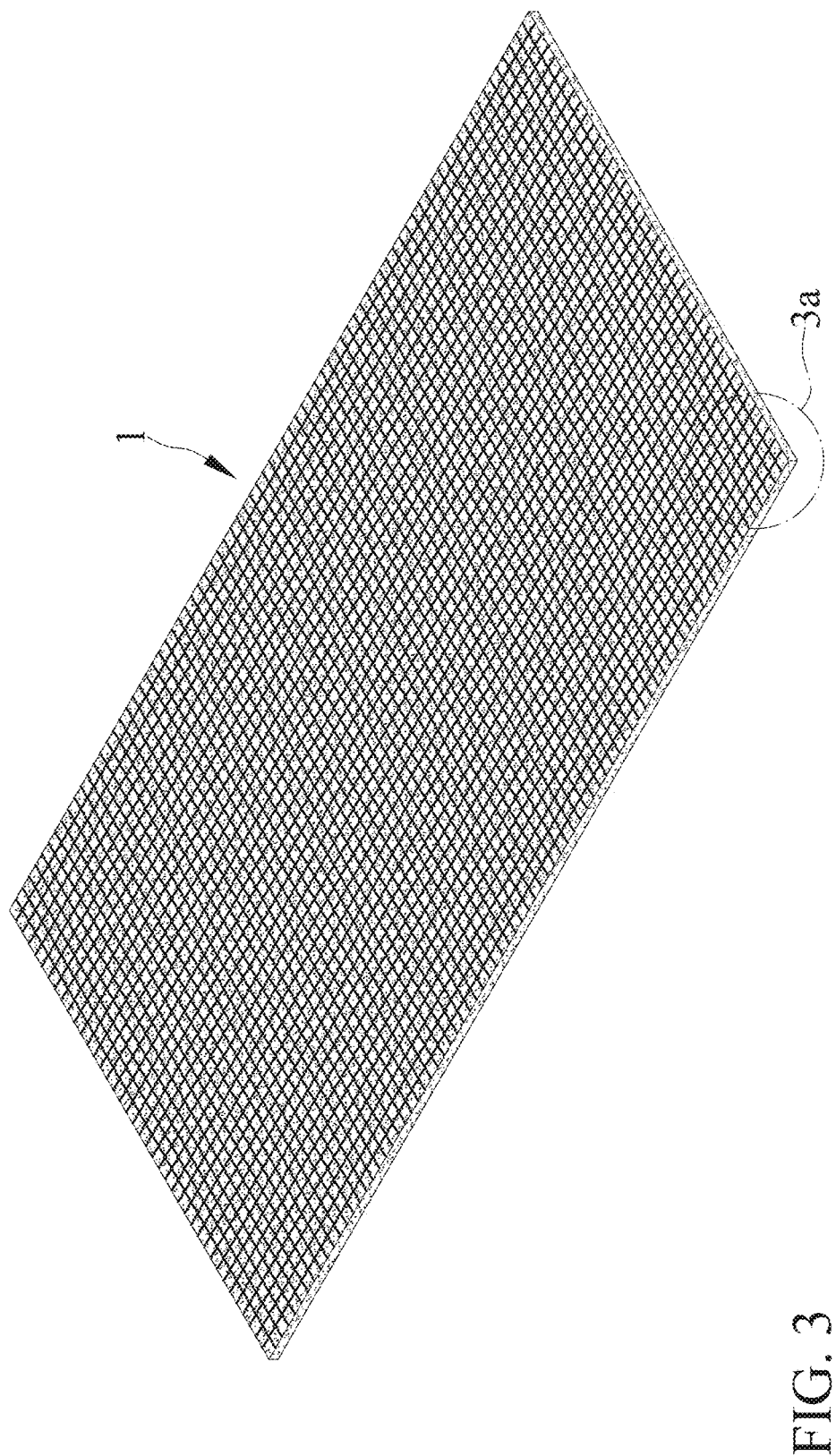
FIG. 3 is a perspective view of the halogen-free flame-retardant thermoplastic braided fiber reinforced polymer composite board manufactured by means of the manufacturing method.
Figure 4:
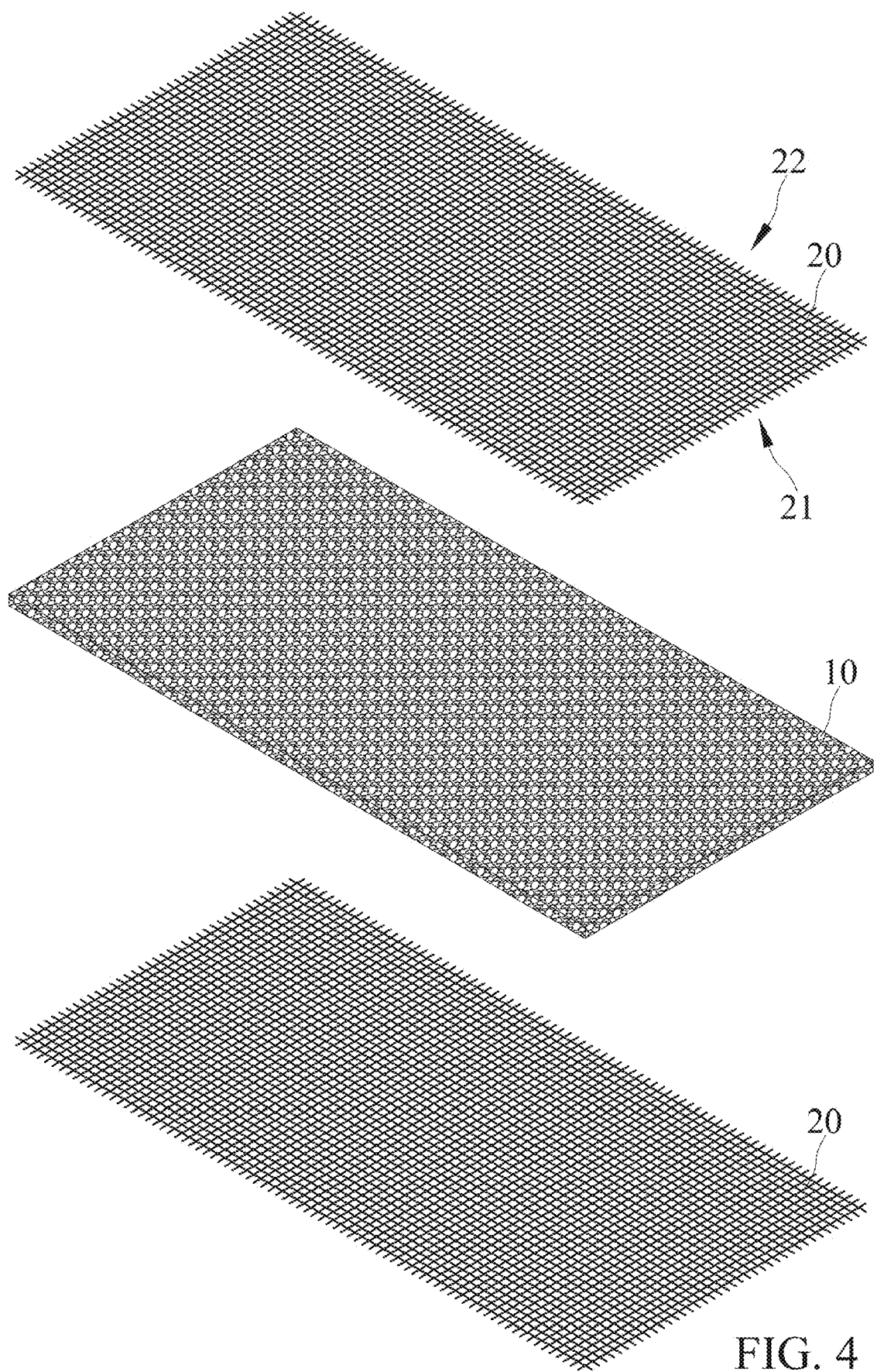
FIG. 4 is an exploded, perspective view of the halogen-free flame-retardant thermoplastic braided fiber reinforced polymer composite board of FIG. 3.
Figure 5:
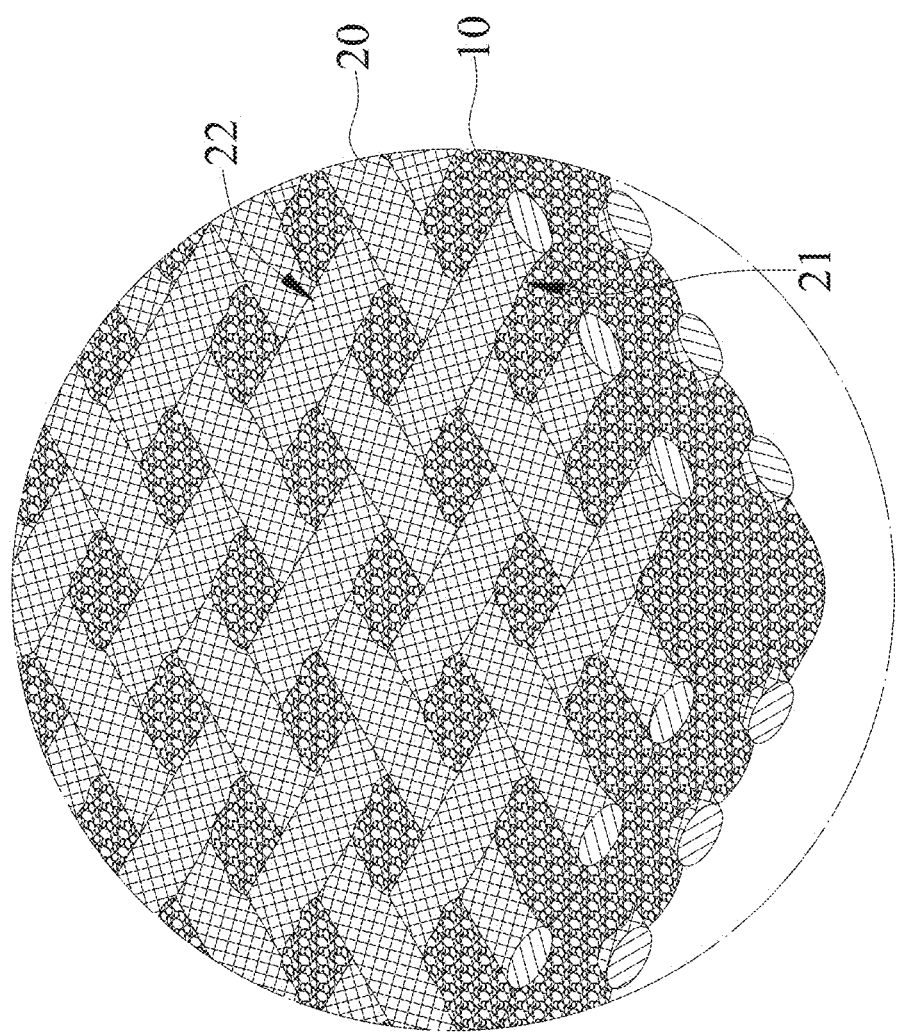
FIG. 5 is an enlarged view of circled portion "3a" shown in FIG. 3.

Please refer to FIGS. 3-5, a halogen-free flame-retardant thermoplastic braided fiber reinforced polymer composite board 1 manufactured by means of the manufacturing method includes a recycled fiber core layer 10 and at least one reinforcement layer 20. The recycled fiber core layer 10 is formed by a recycled material containing a halogen-free flame-retardant thermoplastic braided fiber reinforced polymer composite. The at least one reinforcement layer 20 is formed by a fiber material or a fabric with pores, and with the reinforcement layer 20 has a first side 21 and a second side 22. The recycled fiber core layer 10 and the at least one reinforcement layer 20 are stacked and hot pressed to cause the halogen-free flame-retardant thermoplastic braided fiber reinforced polymer composite of the recycled fiber core layer 10 penetrating into the pores of the reinforcement layer 20 and at least a portion of the recycled fiber core layer 10 wrapped on the first side 21 of the at least one reinforcement layer 20 to form a composite board in which dissimilar materials of recycled fiber core layer 10 and the reinforcement layer 20 are cross-linked with each other.

In a preferred embodiment, the halogen-free flame-retardant thermoplastic braided fiber reinforced polymer composite board 1 includes one recycled fiber core layer 10 and two reinforcement layers 20 respectively located on two opposite sides of the recycled fiber core layer 10. That is, the two reinforcement layers 20 are located in the first layer and the third layer, and the recycled fiber core layer 10 is located in the second layer to form a sandwich structure. It is understandable that the recycled fiber core layer 10 and the reinforcement layer 20 can also be formed into a halogen-free flame-retardant thermoplastic braided fiber reinforced polymer composite board 1 with different lamination combinations and different processing forms, and they are not limited to those described number of layers or the state of stacking in this embodiment.

The manufacturing method of the halogen-free flame-retardant thermoplastic braided fiber reinforced polymer composite board 1 and the halogen-free flame-retardant thermoplastic braided fiber reinforced polymer composite board 1 of the manufacturing method of the present invention can effectively recover and recycle the fiber composite material waste. Further, the fiber length of the recycled fiber core layer 10 is 5 to 20 mm to achieve an excellent mechanical strength and to pass UL94-V0 flammability standard (1/32 inch thickness).

Although specific embodiments have been illustrated and described, numerous modifications and variations are still possible without departing from the scope of the invention. The scope of the invention is limited by the accompanying claims.

The invention claimed is:

1. A manufacturing method of a halogen-free flame-retardant thermoplastic braided fiber reinforced polymer composite comprising steps of:
   (A) recycling a used material containing a halogen-free flame-retardant thermoplastic braided fiber reinforced polymer composite having a flammability rating of UL94 V-0;
   (B) adding a polymer base material to the recycled used material to form a core layer material and extruding the core layer material with a low shear extruder;
   (C) hot pressing the core layer material by rollers to obtain a recycled fiber core layer;
   (D) preparing a reinforcement layer containing a fiber material or a fabric with pores; and
   (E) stacking and hot pressing the recycled fiber core layer and the reinforcement layer to cause the halogen-free flame-retardant thermoplastic braided fiber reinforced polymer composite of the recycled fiber core layer penetrating into the pores of the reinforcement layer to form a composite board in which dissimilar materials of recycled fiber core layer and the reinforcement layer are linked with each other.

2. The manufacturing method as claimed in claim 1, wherein in step (A), a size of the recycled used material containing a halogen-free flame-retardant thermoplastic braided fiber reinforced polymer composite is 20 to 40 mm.

3. The manufacturing method as claimed in claim 1, wherein in step (B), the polymer base material is a thermoplastic resin.

4. The manufacturing method as claimed in claim 3, wherein in step (B), the thermoplastic resin is polycarbonate.

5. The manufacturing method as claimed in claim 3, wherein in step (B), the thermoplastic resin is a virgin material or a recycled material, and the recycled material does not contain inorganic fiber or inorganic powder.

6. The manufacturing method as claimed in claim 3, wherein in step (B), a screw speed of the low shear extruder is 20 to 80 rpm, and an extrusion temperature of the low shear extruder is 200 to 280° C.

7. The manufacturing method as claimed in claim 1, wherein in step (B), a screw pitch of the low shear extruder is 10 to 15 cm, and a screw groove depth of the low shear extruder is 20 mm.

8. The manufacturing method as claimed in claim 1, wherein in step (C), a temperature of the rollers is 50 to 200° C., and a gap of the rollers is 0.5 to 2 mm.

9. The manufacturing method as claimed in claim 1, wherein in step (C), a fiber length of the recycled fiber core layer is 5 to 20 mm, and a thickness of the recycled fiber core layer is 0.3 to 1.2 mm.

* * * * *